Nov. 13, 1962   H. C. PORTER ETAL   3,064,147
CONSEQUENT POLE ELECTRIC MOTOR
Filed July 3, 1958   2 Sheets-Sheet 1
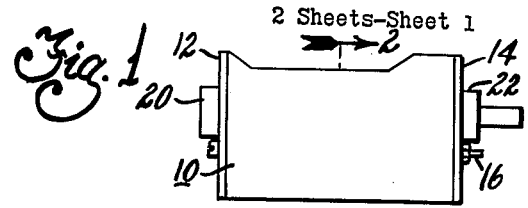
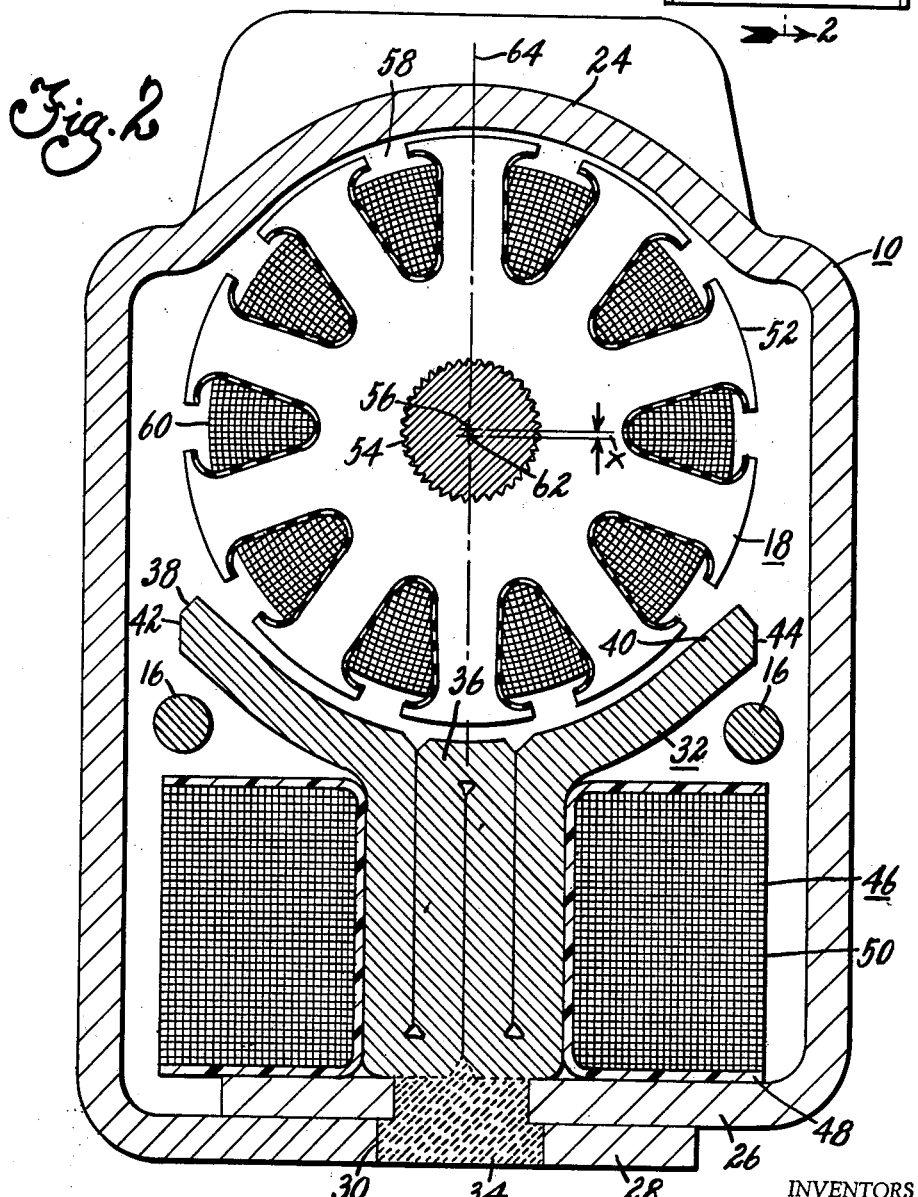
INVENTORS
HERBERT C. PORTER
FRANK J. TERKOSKI
HAROLD J. WARNER JR.
BY  *G. H. Strickland*
THEIR ATTORNEY

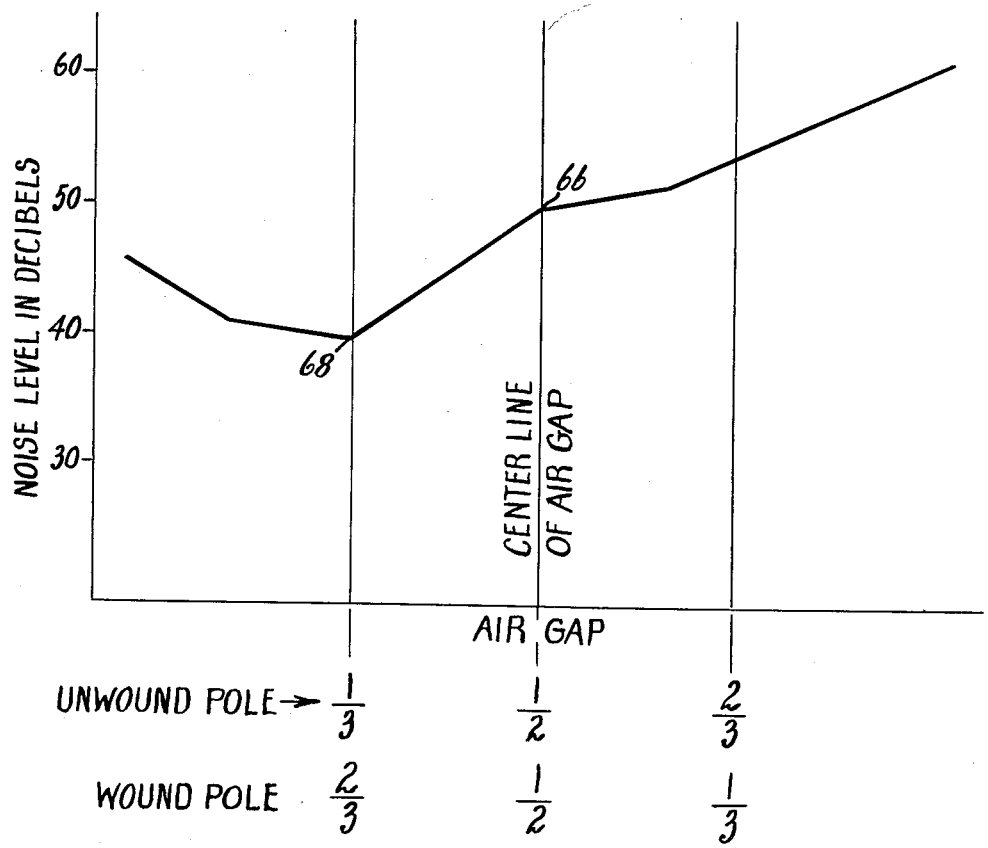

United States Patent Office 3,064,147
Patented Nov. 13, 1962

3,064,147
CONSEQUENT POLE ELECTRIC MOTOR
Herbert C. Porter, Frank J. Terkoski, and Harold J. Warner, Jr., Rochester, N.Y., assignors to General Motors Corporation, Detroit, Mich., a corporation of Delaware
Filed July 3, 1958, Ser. No. 746,516
6 Claims. (Cl. 310—40)

This invention pertains to electric motors, and particularly, to a method and means for reducing the noise level in two-pole electric motors having only a single wound pole.

In order to reduce the cost of small two-pole direct current electric motors, it has been proposed to use only a single wound pole and a formed unwound pole integral with the frame, the frame constituting a magnetic yoke through which the unwound pole is magnetized. A motor of this general type is disclosed in copending application Serial No. 680,238 filed August 26, 1957, in the name of Simmons et al. and assigned to the assignee of this invention. However, it has been determined that the over-all general noise level in motors of this type is appreciably greater than in comparable motors wherein both poles carry energized windings. The present invention relates to a method and means for reducing the noise level in two-pole motors having only a single wound pole. Accordingly, among our objects are the provision of a method of minimizing magnetic noise in a two-pole electric motor having a single wound pole; and the still further provision of a two-pole electric motor having a single wound pole wherein the air gap between the armature and the wound pole is greater than the air gap between the armature and the unwound pole so as to reduce the magnetic noise to a minimum without impairing the efficiency of the motor.

The aforementioned and other objects are accomplished in the present invention by determining the optimum distribution of the air gap between the armature and the two poles at which the magnetic noise is a minimum without impairing the efficiency of the motor, and thereafter supporting the armature eccentrically with respect to the formed pole and the wound pole so as to produce an electric motor having a minimum over-all general noise level. Specifically, the motor may be of the general type disclosed in the aforementioned copending application and thus includes a single piece sheet metal frame, substantially rectangular in cross section, having overlapping end portions which are held in assembled relation by means of welds. A sheet metal pole piece of the general type shown in copending application Serial No. 679,206 filed August 20, 1957, in the name of Wilbur L. Carlson and assigned to the assignee of this invention, is attached to the overlapping end portions of the frame by any suitable means, such as a puddle weld. The side of the frame opposite the overlapping end portions is formed with an integral arcuate formed pole. The pole piece carries a field coil assembly, and thus constitutes a wound pole, and the formed pole is magnetized through the magnetic yoke constituted by the frame.

A conventional wound armature including a laminated core is rotatably journalled in bearing means supported by end caps which are attached to the frame by a pair of tie bolts. Heretofore, the armature has been rotatably journalled in end cap bearings on an axis which coincides with the center of the cylindrical air gap between the formed pole and the wound pole so that the air gaps between the wound pole and the armature, and the formed pole and the armature are equal. This assembly was made in accordance with conventional two-pole motor practice, such as shown, for example, in the Swarthout Patent 2,629,061 wherein the minimum noise level is obtained when the armature is concentrically mounted between the two energized poles, thus resulting in symmetrical air gaps.

With this type of assembly it was noticed that the over-all general noise level of a motor having only a single wound pole was appreciably greater than a comparable motor wherein both poles are wound. Moreover, it has been determined that the increase in noise level is due to magnetic noise having a frequency equal to the number of slots in the armature multiplied by the rotational speed of the armature. It is believed that the cause of the magnetic noise is due to the reaction forces between the magnetic flux surrounding the armature windings and the magnetic flux produced by the field winding on the wound pole. Thus, with the armature concentrically mounted between an unwound pole and a wound pole, the density of the magnetic flux at the wound pole is greater than the magnetic flux at the unwound pole so that the reaction forces cause the armature to vibrate at a frequency equal to the number of armature slots times the rotation speed of the armature in revolutions per second, and this armature vibration is transmitted to the end caps and the frame. Accordingly, it has been determined that in order to reduce the magnetic noise to a minimum the unsymmetrical flux distribution between the unwound pole and the wound pole must be compensated for by the position of the armature.

In carrying out our method, the position of the armature is varied to determine the optimum armature position which results in a minimum magnetic noise without impairing motor efficiency. This is accomplished by moving the armature away from the wound pole and closer to the unwound pole and measuring the noise level while maintaining the axis of the armature in the central vertical plane of the motor in which the center of the formed pole and wound pole is located. In this manner it was determined that the minimum noise level was obtained with substantially two-thirds of the total air gap between the armature and the wound pole, and substantially one-third of the total air gap between the armature and the unwound pole. The level of noise was reduced by as much as ten decibels when the armature was moved from a position where the air gaps were equal to a position where the air gaps were substantially one-third at the unwound pole and substantially two-thirds at the wound pole. Thus, the armature is eccentrically mounted between the unwound pole and the wound pole by properly locating the bearings in the end caps.

Further objects and advantages of the present invention will be apparent from the following description, reference being had to the accompanying drawings, wherein a preferred embodiment of the present invention is clearly shown.

In the drawings:
FIGURE 1 is a view in elevation of a motor constructed according to the present invention.
FIGURE 2 is an enlarged sectional view taken along line 2—2 of FIGURE 1.
FIGURE 3 is a graph depicting the variation in magnetic noise with variation in the air gaps between the armature and the poles of a two pole motor having a single wound pole.

With particular reference to FIGURES 1 and 2 of the drawings, a direct current electric motor is shown including a single piece sheet metal frame 10 having open ends which are closed by end caps 12 and 14, respectively. The end caps 12 and 14 are maintained in assembled relation with the frame 10 by means of a pair of tie bolts indicated by numeral 16. An armature generally indicated by the numeral 18 is rotatably journalled in bearing means 20 and 22 carried by the end caps 12 and 14, respectively.

With particular reference to FIGURE 2, the frame 10 comprises a single steel strip having an integral arcuate formed pole 24 and overlapping end portions 26 and 28, disposed opposite the formed pole 24. The overlapping end portions 26 and 28 may be connected by a plurality of welds, not shown. The overlapping end portions 26 and 28 are formed with one or more pairs of aligned apertures as indicated by numeral 30. A sheet metal pole piece 32 is attached to the overlapping end portions 26 and 28 of the frame by a puddle weld indicated by numeral 34.

As shown in FIGURE 2, the sheet metal pole piece 32 has an intermediate portion folded back and forth upon itself to form a pole body 36 having a thickness equal to four times the thickness of the strip. The ends 38 and 40 of the sheet metal strip are deformed to an arcuate configuration and constitute pole shoes. The tips of the pole shoes may be chamfered as indicated by numerals 42 and 44, respectfully. Prior to puddle welding the pole piece 32 to the frame, a field coil assembly including a bobbin 48 and one or more coils 50, is placed over the pole body 36 so that when the pole piece is welded to the frame, the field coil assembly will be maintained in assembled relation therewith.

The armature 18 includes a core comprising a plurality of stacked laminations as indicated by numeral 52 which are fastened to an armature shaft 54. The axis of rotation of armature shaft 54 is indicated by numeral 56. As depicted in FIGURE 2, each armature lamination is formed with ten equidistantly spaced slots 58 within which armature windings 60 are disposed.

Upon energization of the field coil assembly 46, the formed pole 24 is magnetically energized through the frame 10 which in effect constitutes a magnetic yoke. The pole piece 32 constitutes a wound pole while the pole 24 constitutes an unwound pole. As alluded to hereinbefore, in conventional two pole direct current electric motors wherein both poles are wound, that is both poles carry field windings, the armature is concentrically mounted in the cylindrical air gap defined between the opposed poles. As seen in FIGURE 2, the poles 24 and 32 define substantially a cylindrical air gap having a center indicated by numeral 62.

However, as alluded to hereinbefore, when an armature is concentrically mounted in the air gap between an unwound pole and a wound pole, the over-all general noise level of the motor is appreciably greater than that of comparable motors wherein both poles are wound. Moreover, it has been determined that the increase in the noise level is primarily due to a pure tone magnetic noise having a frequency equal to the number of slots in the armature multiplied by the rotational speed of the armature in revolutions per second. Thus, with an armature having ten slots as indicated in FIGURE 2, and a rotational speed of 3000 r.p.m., the magnetic noise is a pure tone having a frequency of 500 cycles per second. This magnetic noise is believed to be caused by the reaction forces between magnetic flux surrounding the armature windings and the magnetic flux produced by the field coil assembly due to the fact that with a single wound pole the density of the magnetic flux at the wound pole is appreciably greater than the density of magnetic flux at the unwound pole. Moreover, this unsymmetrical distribution of magnetic flux densities results in armature vibration, which armature vibration is transmitted to the end caps and the frame.

The present invention comprehends a method of reducing the magnetic noise to a minimum, which method comprises the steps of adjusting the position of the armature between the wound and unwound poles while maintaining the armature axis in the central plane of the motor which bisects the unwound pole and the wound pole. This plane is indicated by line 64 in FIGURE 2. The method further comprehends measuring the noise level at various positions of the armature between the poles so as to determine the location at which the minimum noise level occurs. Thereafter, the location of the bearings 20 and 22 in the end caps for a given size motor is fixed so that the armature will be maintained in the adjusted position at which there is a minimum noise level.

As a specific example, in a fractional horsepower motor wherein the armature is substantially 1.5″ in diameter and the diameter of the cylindrical air gap between the wound and the unwound poles is 1.531″, it has been determined that the minimum noise level occurs when substantially one-third of the total air gap is located between the armature and the unwound pole, and substantially two-thirds of the air gap is located between the armature and the wound pole. Thus, with the specific motor construction, the total air gap is .031″ so that the optimum position of the armature axis 56 would be .0052″ towards the unwound pole 24 from the center 62 of the cylindrical air gap between the wound and unwound poles. This distance is indicated by the letter X in FIGURE 2. Accordingly, the air gap between the armature and the unwound pole is .0103″ and the air gap between the armature and the wound pole is .0207″.

With particular reference to FIGURE 3, a typical noise curve for a two-pole direct current electric motor having an unwound, or indirectly magnetized, pole and a wound, or directly magnetized, pole is shown. The ordinate of the graph in FIGURE 3 indicates the noise level in decibels and the abscissa indicates the air gap between the armature and the formed or unwound pole, and the armature and the wound pole. An inspection of this will indicate that when the armature is concentrically mounted between the poles, that is, when the axis of the armature coincides with the center of the cylindrical air gap between the poles, the magnetic noise level at five hundred cycles per second as indicated by point 66 on the curve is approximately fifty decibels. As the air gap between the armature and the unwound pole is decreased thereby resulting in an increased air gap between the armature and the wound pole, the magnetic noise level decreases as a substantially linear function to a point 68 where the noise level is forty decibels and the air gap distribution is one-third between the armature and the unwound pole and two-thirds between the armature and the formed pole. A further decrease in the air gap between the unwound pole and the armature resulting in a further increase in the air gap between the wound pole and the armature causes the noise level to again increase. Similarly, when the air gap at the unwound pole is increased from one-half of the total air gap thereby decreasing the air gap at the wound pole, the noise level increases. Accordingly, it has been determined that the minimum noise level, and hence the optimum distribution of the air gap, occurs when substantially one-third of the total air gap is located between the armature and the unwound pole and two-thirds of the total air gap is located between the armature and the wound pole.

While the embodiment of the invention as herein disclosed constitutes a preferred form, it is to be understood that other forms might be adopted.

What is claimed is as follows:

1. An electric motor including, a frame having opposed wound and unwound poles, and an armature rotatably supported between said poles with the air gap between said armature and said wound pole being greater than the air gap between the armature and the unwound pole.

2. A direct current electric motor including, a frame having two diametrically opposed poles, a field coil assembly carried by one of said poles so as to form a wound pole, the other pole being magnetically energized through said frame and constituting an unwound pole, said poles defining a substantially cylindrical air gap therebetween, and an armature rotatably supported by said frame and eccentrically mounted within said air gap, the axis of said armature being located closer to said unwound pole than to said wound pole.

3. A direct current electric motor including a frame having a pair of oppositely disposed poles, one of said poles being directly magnetized and the other of said poles being indirectly magnetically energized through said frame, said poles defining a substantially cylindrical air gap, and an armature rotatably supported by said frame and eccentrically located with respect to the center of said air gap, the axis of said armature lying in a plane that bisects said poles and is located closer to said indirectly magnetized pole than to said directly magnetized pole.

4. A direct current electric motor including, a frame having an integral arcuate formed pole and a pole piece attached to said frame opposite said formed pole, a field winding assembly supported by said pole piece whereby said pole piece constitutes a wound pole, said formed pole being magnetically energized through said frame so as to constitute an unwound pole, an armature rotatably supported by said frame and disposed between said poles, the air gap between said armature and said wound pole being substantially twice as wide as the air gap between said armature and said unwound pole.

5. A direct current electric motor including, a frame having oppositely disposed wound and unwound poles, a pair of end caps attached to said frame, and an armature rotatably supported by said air gaps and disposed between said poles, said armature being located closer to said unwound pole than to said wound pole so as to reduce the magnetic noise level to a minimum.

6. A direct current electric motor including, a frame having an integral arcuate formed pole and a pole piece attached to said frame opposite said formed pole, a field winding assembly carried by said pole piece whereby said pole piece constitutes a wound pole, said formed pole being magnetically energized through said frame and constituting an unwound pole, a pair of end caps secured in assembled relation with said frame, and an armature rotatably supported by said end caps and disposed between said poles located so that substantially one-third of the total air gap between said armature and said poles is between said armature and said unwound pole and substantially two-thirds of the total air gap is between said armature and said wound pole, whereby the magnetic noise level is reduced to a minimum.

References Cited in the file of this patent
UNITED STATES PATENTS
1,673,794    Ayers _____ June 19, 1928